US012791528B2

(12) United States Patent
Vansweevelt et al.

(10) Patent No.: US 12,791,528 B2
(45) Date of Patent: Nov. 10, 2026

(54) METHOD AND DEVICE FOR DETERMINING A BELT TENSION OF A MACHINE DRIVE BELT

(71) Applicant: ATLAS COPCO AIRPOWER, NAAMLOZE VENNOOTSCHAP, Wilrijk (BE)

(72) Inventors: Jan Vansweevelt, Wilrijk (BE); Wim Frans Monique Tirry, Wilrijk (BE); Philippe Geuens, Wilrijk (BE); Robert Brijder, Lommel (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 333 days.

(21) Appl. No.: 18/559,479

(22) PCT Filed: Jun. 8, 2022

(86) PCT No.: PCT/EP2022/065593

§ 371 (c)(1),
(2) Date: Nov. 7, 2023

(87) PCT Pub. No.: WO2022/263258

PCT Pub. Date: Dec. 22, 2022

(65) Prior Publication Data

US 2024/0230599 A1 Jul. 11, 2024

(30) Foreign Application Priority Data

Jun. 15, 2021 (BE) .................................. 2021/5468

(51) Int. Cl.
*G01N 29/14* (2006.01)
*G01N 29/11* (2006.01)
(Continued)

(52) U.S. Cl.
CPC ............. *G01N 29/14* (2013.01); *G01N 29/11* (2013.01); *G01N 29/42* (2013.01);
(Continued)

(58) Field of Classification Search
CPC ........ G01N 29/14; G01N 29/11; G01N 29/42; G01N 29/4427; G01N 29/46;
(Continued)

(56) References Cited

U.S. PATENT DOCUMENTS 7,185,546 B2 3/2007 Le
9,182,300 B2 11/2015 Themm et al.
(Continued)

FOREIGN PATENT DOCUMENTS

CN 102124328 7/2011
CN 101263499 B 3/2013
(Continued)

OTHER PUBLICATIONS

Fazenda et al., "Measurement and diagnostic of engine belt physical condition from acoustic signals", ICCAS-SICE, Aug. 18, 2009, 3 pages.
(Continued)

*Primary Examiner* — Xin Y Zhong
(74) *Attorney, Agent, or Firm* — HSML P.C.

(57) ABSTRACT

A computer-implemented method for determining a belt tension of a drive belt of a machine, based on a sound recording, including the steps of initiating a recording of sound, recording the sound during a primary time interval, discretising the sound into time samples, thereby obtaining a data set, filtering the data set, determining an average excitation spectrum, compensating for the average excitation spectrum, determining a confidence coefficient based on a highest and second highest extremum, and when the confidence coefficient exceeds a predefined value, determin-
(Continued)

ing the belt tension based on a frequency of the highest extremum.

10 Claims, 3 Drawing Sheets

(51) Int. Cl.
*G01N 29/42* (2006.01)
*G01N 29/44* (2006.01)
*G01N 29/46* (2006.01)

(52) U.S. Cl.
CPC ......... *G01N 29/4427* (2013.01); *G01N 29/46* (2013.01); *G01N 2291/0237* (2013.01); *G01N 2291/02827* (2013.01)

(58) Field of Classification Search
CPC . G01N 2291/0237; G01N 2291/02827; G01N 29/4436
See application file for complete search history.

(56) References Cited

U.S. PATENT DOCUMENTS

| | | | | |
|---|---|---|---|---|
| 2004/0154413 | A1* | 8/2004 | Coy | G01M 13/023 73/862.453 |
| 2005/0274197 | A1 | 12/2005 | Le | |

FOREIGN PATENT DOCUMENTS

| | | | |
|---|---|---|---|
| CN | 108040489 | | 5/2018 |
| CN | 110487917 | | 11/2019 |
| EP | 3830562 | | 6/2021 |
| JP | H02-190727 | A | 7/1990 |
| JP | 2015203484 | A | 11/2015 |
| KR | 20180001222 | | 1/2018 |
| KR | 20180107871 | A | 10/2018 |
| WO | 2002/079747 | | 10/2002 |
| WO | 2020/025390 | | 2/2020 |

OTHER PUBLICATIONS

International Search Report and Written Opinion issued in PCT/EP2022/065593, dated Sep. 1, 2022, 9 pages.
Chinese Office Action issued in CN Application No. 202280033968.7, dated Mar. 18, 2026, 12 pages, English translation provided.
Indian First Examination Report issued in Indian Application No. 202337068695, dated Jul. 30, 2026, 10 pages, English translation.
https://ieeexplore.ieee.org/document/5334107 (accessed Aug. 26, 2026) for "Measurement and diagnostic of engine belt physical condition from acoustic signals," presented Aug. 18-21, 2009, Print ISBN:978-4-907764-34-0.
Brazilian Office Action issued in BR Application No. 112023020344-9, dated Jul. 28, 2026, 12 pages, English machine translation provided.

* cited by examiner

METHOD AND DEVICE FOR DETERMINING A BELT TENSION OF A MACHINE DRIVE BELT

TECHNICAL FIELD

The present invention is in the field of determining a belt tension of a drive belt of a machine, e.g. a compressor, for transmitting a mechanical torque.

STATE OF THE ART

A drive belt is a type of power transmission for transmitting mechanical torque from a driven element to an element to be driven. The first element is, for example, driven by an electric motor or a combustion engine, wherein the element to be driven is driven by the torque transmission.

In a machine comprising a belt drive with associated belt, such as, for instance, a compressor, it is important that the belt has a mechanical tension with a certain value or is in a certain range of values. Too high a tension can, for example, lead to accelerated wear, while too low a tension gives rise to slip or even the risk may arise that the belt will detach from the driven element and/or the element to be driven.

For both safety reasons and operating conditions, it is therefore recommended to check the belt tension at regular intervals. This check can be done by measuring the tension directly. Such direct measurement is not always possible, however, and if it is, it is labour-intensive.

The belt tension can also be measured indirectly by exciting it and analysing the noise generated. An amplitude at a certain dominant frequency in the sound is then representative of the belt tension. This technique is known and is disclosed in U.S. Pat. Nos. 7,185,546B2 and 9,182,300B2.

In U.S. Pat. No. 7,185,546B2 a method is disclosed in which a sound recording is recorded through a microphone of an excited drive belt. The sound recording is then analysed by means of a Fourier analysis that determines the spectrum of the sound recording. In addition, stochastic noise is filtered out from the recordings to determine the natural vibration frequency of the drive belt. The belt tension is then determined on the basis of this natural vibration frequency and compared with a previously correctly set belt tension. In U.S. Pat. No. 9,182,300B2, a similar method is disclosed together with a portable user device configured to perform the method in proximity to the belt.

A drawback herein, however, is that, with the known methods, a user has no indication of the reliability and/or correctness of the belt tension, as determined via the known method. For example, the ambient noise or noise from possible other machines in the proximity of the drive belt can negatively influence the result without the user being aware of it.

SUMMARY OF THE INVENTION

It is an object of the present invention to provide a method and device for accurately determining the belt tension of a drive belt or belt for short, and which addresses the above identified drawbacks.

This object is achieved, according to a first aspect of the invention, by providing a computer-implemented method according to claim 1.

The invention comprises a computer-implemented method for determining a belt tension of a drive belt of a machine comprising a belt for transmitting a mechanical torque, based on a sound recording, the method comprising the steps of initiating a recording of sound in the proximity of the drive belt; recording the sound during a primary time interval comprising a part t_b during which the drive belt is not excited and a part t_a within which the drive belt is excited one or more times; Discretising the sound of the primary time interval into time samples according to a predefined sampling frequency, thereby obtaining a data set; filtering the data set based on a bandpass filter, thereby obtaining a filtered data set; determining within part t_b of the filtered data set a trigger threshold value indicative of a distribution of the values therein and a reference spectrum; determining an average excitation spectrum of excitation spectra of one or more secondary time intervals within part t_a of the filtered data set, a secondary time interval comprising a value which exceeds the trigger threshold value; and a root mean square of the values which exceeds a predefined factor; compensating the average excitation spectrum with the reference spectrum, thereby obtaining a compensated excitation spectrum; determining a confidence coefficient based on a highest and a second highest extremum within the compensated excitation spectrum; and when the confidence coefficient exceeds a predefined value, determining the belt tension based on a frequency of the highest extremum.

According to a second aspect of the invention, a user device is disclosed, configured to determine a belt tension of a machine according to the computer-implemented method of the first aspect.

The first step is to initiate or start up the recording of the sound. This can be done, for example, by giving an instruction by a user via the user device. In doing so, the user device is held in close proximity to the drive belt. It should further be understood that proximity means that the user device is sufficiently close to the machine under examination, which is sufficiently apparent to the person skilled in the art, familiar with sound-based belt tension determination. Furthermore, the user device may comprise an external microphone which is coupled to the user device in order to be able to optimally perform the measurements.

The microphone can be a standard microphone or a microphone adapted to perform the measurements. It should further be understood that a person skilled in the art has knowledge of which microphone is most suitable and, if necessary, can be chosen as a function of the belt tension to be measured. For example, and formulated differently, a range within which the microphone can record with high accuracy, may correspond to the expected range within which the frequency expressing the belt tension is located.

After recording, the sound will be recorded by the user device for a certain period of time and processed through the computer-implemented method, which will be explained further.

The period during which the sound is recorded, is further referred to as the primary time interval. This primary time interval further comprises secondary sub-intervals, being a part t_b and a part t_a.

In part t_b the drive belt is not excited and in part t_a the drive belt is excited one or more times. The separation between part t_b and part t_a can be pre-set, for example by a fixed and predefined time period part t_b that starts running after initiation. The user must then wait at least this period of time before exciting the belt one or more times. The separation may also be notified to the user by the user device with, for example, an instruction to excite the belt.

For the time period t_a in which the belt is excited, it should be understood that the belt is not excited in a continuous manner, but that the user will strike the belt one or more times, leaving sufficient time between each stroke to sufficiently perceive an effect thereof. Again, it is clear to a person skilled in the art what is meant by this.

The order of magnitude of the time period t_a is preferably 5 s to 60 s, and the order of magnitude of the time period t_b is preferably 2 s to 10 s. The orders of magnitude also depend on the number of envisioned excitations.

Then, the recorded sound is discretised into time samples according to a predefined sampling frequency. The order of magnitude of this frequency is preferably 10 kHz to 48 kHz. As a result, the registration is represented by discrete values, in particular a data set, and is therefore suitable for further processing in a processing unit. In this further processing, the data set is filtered by a bandpass filter.

The bandpass filter will remove irrelevant frequency ranges from the dataset resulting in a filtered dataset. The limits of the bandpass filter can be set on the basis of an expected frequency f corresponding to the belt tension, in which case, as an example, a lower and upper limit of f−50 Hz and f+50 Hz respectively can be set. In addition, a minimum lower limit can be respected at which the microphone can still perform a usable measurement. Such minimum lower limit is, for example, 40 Hz.

In part t_b of the filtered data set, hence after Discretising and filtering, a trigger threshold value and a reference spectrum are then determined. The trigger threshold value is indicative of the distribution of the data within part t_b and is, for example, an average value, a standard deviation, an arithmetic mean, preferably a root mean square, or any other value representing a distribution, optionally multiplied by a constant for further processing within the method. It should therefore be understood that a value is chosen which expresses the distribution of sound-expressing values in the environment of the belt during a period in which the belt is not excited. In addition to determining the trigger threshold value, also a reference spectrum is determined. The reference spectrum is the spectrum of the sound in part t_b, hence when the belt is not excited, and is therefore representative of background noise in the proximity of the belt.

Subsequently, one or more secondary time intervals are determined within the part t_a, hence within the time period when the belt is excited. A secondary time interval is a time interval during which at least one value exceeds the trigger threshold value and the root mean square value of the value exceeds a predefined factor. It should therefore be understood that this implies a double condition. Furthermore, a secondary time interval is at most equal to the time interval t_a, but will usually be smaller than time interval t_a.

An excitation spectrum is then determined for each secondary time interval, after which an average of all these spectra is calculated. This average excitation spectrum is then compensated with the previously determined reference spectrum from part t_b to a compensated excitation spectrum.

This compensation can be done by subtracting from the amplitude at a specific frequency in the average excitation spectrum the amplitude from the corresponding frequency in the reference spectrum. Furthermore, this can be done under certain conditions, such as, for example, when the absolute value of the difference between the amplitudes of frequencies in the reference spectrum and of the average excitation spectrum is smaller than a predefined value. For frequencies where this absolute value is larger than or equal to this predefined value, the amplitude can remain unchanged in the average excitation spectrum. This ensures that tonal components occurring in both the reference spectrum and the average excitation spectrum will be compensated, but such that tonal components created by the excitation of the belt remain present in the average excitation spectrum.

Furthermore, the compensation can also be effected by determining a difference between the reference spectrum and the excitation spectrum, in which case values for compensation which exceed within this difference spectrum a predefined threshold value are subsequently excluded.

Next, a confidence coefficient is determined based on a highest and second highest extremum within the compensated excitation spectrum. An extremum is a maximum or minimum function value where no other values are above or below locally, as known in mathematical analysis. The confidence coefficient is then a ratio between the highest and second highest extremum.

Finally, the belt tension will only be determined if the previously-determined confidence coefficient exceeds a predefined value. This determination is then made on the basis of the frequency corresponding to the highest extremum.

In contrast to the method already known in the prior art, according to the invention a result will only be obtained when it can be established with great certainty that the measurement is reliable. This will prevent unnecessary actions from being taken, for example, due to incorrect measurements. Furthermore, background noise is automatically taken into account without the user having to ensure that sound sources different from the machine but in its proximity must be turned off or at least muted.

Furthermore, according to an embodiment, one or more characteristics of the drive belt can be retrieved, such as a mass density, a circumference, a pulley, and/or a modulus of elasticity, and the belt tension can be expressed on the basis of one or more of these characteristics in combination with the previously determined frequency.

In addition to calculating and reporting the belt tension as such, the characteristics of the belt can also be taken into account. This gives a user an even more accurate picture of its status.

Furthermore, according to an embodiment, the computer-implemented method further comprises the steps of retrieving one or more expected characteristics of the machine, comparing the belt tension with the one or more expected characteristics, and reporting a status of the drive belt based on of the comparison.

In other words, in addition to simply reporting the belt tension, the method can also report the proper functioning of the machine by comparing the determined belt tension with an expected belt tension, if necessary supplemented with other characteristics, such as the age of the machine, number of operating hours, and/or maintenance intervals. This gives a user a clear insight into the status of the drive belt and it is possible to accurately determine whether a maintenance intervention is necessary.

Additionally, the method can determine a first amplitude of the sound at the frequency of the highest extremum as well as a second amplitude at the half-frequency thereof. When the ratio between this second and the first amplitude exceeds a predefined value, the method can correct the data set by eliminating the values associated with the frequency of the highest extremum. This optional step is to avoid an erroneous measurement that can be manifested by the presence of higher harmonics, usually second harmonics.

Finally, the method can also supply and, if necessary, set appropriate operating parameters of the machine based on the characteristics and the belt tension. This means that these appropriate operating parameters are reported, and/or that the machine automatically adjusts its operation to an incorrectly set belt tension in order to avoid or at least reduce further malfunction and any damage that may result therefrom.

According to a second aspect of the invention, a computer program product, containing computer-executable instructions to perform the computer-implemented method of the first aspect when this program is executed on a computer, is disclosed.

According to a third aspect, a computer-readable storage medium containing the computer program product according to the second aspect is disclosed.

According to a fourth aspect, a user device configured to determine a belt tension of a machine according to the computer-implemented method according to the first aspect, is disclosed. This user device is, for example, a custom-made mobile device to perform the method, a smartphone, laptop, or tablet on which an application comprising the method is installed.

Finally, according to a fifth aspect, a machine comprising the user device according to the fourth aspect, is disclosed. In other words, the machine can include a module on which the method can be executed.

BRIEF DESCRIPTION OF THE DRAWINGS

The invention will now be further described with reference to the drawings in which.

DESCRIPTION OF THE EMBODIMENTS

Figure 1:
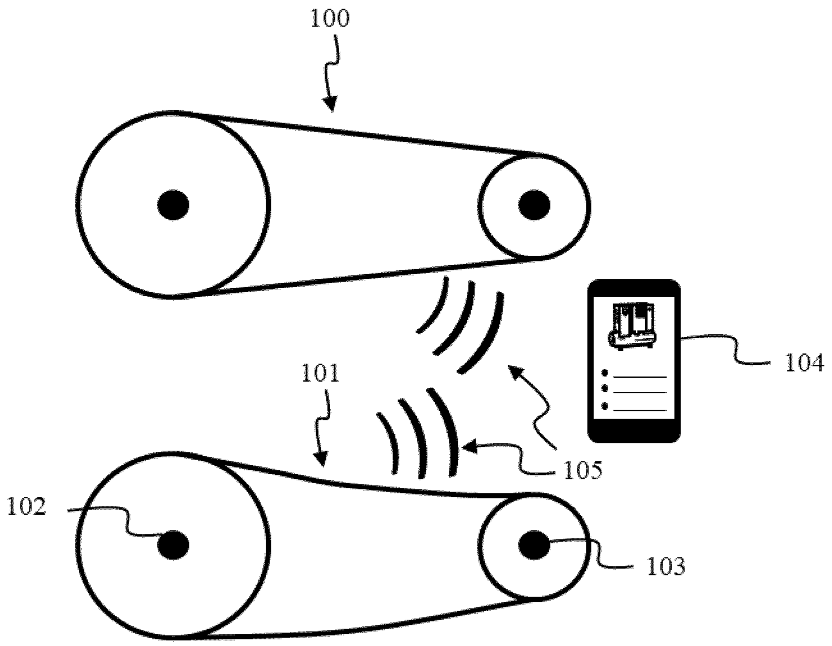
FIG. 1 illustrates a schematic arrangement of a belt drive and measuring device.

FIG. 1 illustrates a belt 100, 101 tensioned between two shafts or pulleys 102, 103 wherein one shaft is a drive shaft and another shaft is a driven shaft. By this, a mechanical torque is transferred from one shaft to the other. The torque transfer takes place by means of the belt 100, 101. It is important here that the belt 100, 101 is sufficiently tensioned to allow the transfer to take place efficiently. Here, belt 100 illustrates a belt that is correctly tensioned, while belt 101 is insufficiently tensioned. The arrangement as illustrated in FIG. 1 is built into a machine, such as, for example, a compressor.

The correct belt tension to be set depends on the type of belt, its length, the distance between the shafts 102, 103, the machine in which it is installed, and optionally other parameters, such as ambient temperature and pressure where the machine is installed. As a rule, the manufacturer of the machine will provide a value within a range that is considered correct.

Since the belt tension will change over time after it has been set correctly, the belt tension should be measured at certain service intervals. This is done by a device 104 configured to perform the method of claim 1. The belt 101 is then excited, after which sound 105 by the excitation is registered by the device 104.

Figure 2:
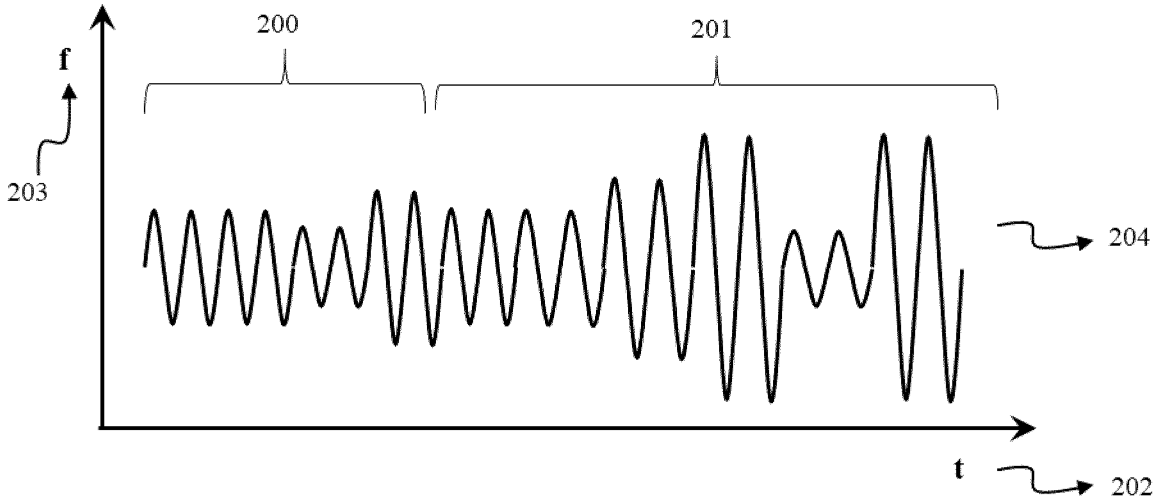
FIG. 2 illustrates a sound recording over a certain time interval.

FIG. 2 illustrates a recording 204 of the sound 105, being the frequencies 202 of the sound 105 measured over time 202. This recording 204 comprises a time period 200 during which the belt 101 is not excited and a time period 201 during which the belt 101 is excited one or more times. The difference between both time periods 200, 201 is determined by the device 104 generating a signal for instructing a user to excite the belt 101.

To record the sound 105, the device 104 comprises a sound sensor or microphone which may be located internally or externally to the housing of the device 104. Furthermore, the device 104 may include a screen for displaying information about the performed method for determining the belt tension of the belt 101. The device 104 also includes a processor, a memory, a communication interface for wireless or wired communication, and control buttons and other actuators.

During registration 204, the device 104 is held in close proximity to the belt 101. A user can then initiate the registration by using a push button or the screen, or any other way of starting the method via instruction. Subsequently, the period 200 during which no sound from the excited belt 101 is present, is recorded, and a time period 201 during which sound from excitations is present. The transition from period 200 to period 201 is then communicated to the user, as mentioned earlier, via a suitable signal, such as, for instance, a vibration with an actuator in the device 104. Another possibility is that a user device outputs a signal via a display, such as a colour change from red to green.

The excitation of the belt 101 is done by briefly pushing or pulling it and then releasing it. This can be done manually or via a suitable mechanical device. This will cause the belt 101 to emit sound 105. During the time period 201, this operation is performed at least once, but can also be repeated.

The sound recording 204 consists of recording the emitted sound 105 by means of one or more microphones and is then discretised into time samples. Discretising in time is further also understood to mean sampling in time wherein a series of samples that represent the sound, are produced. These samples or time samples can then be stored in the memory of the device 104 for further processing.

The device 104 can then process the samples locally and report the result to a user. Alternatively, the data of the sound can be sent to another device which performs the processing and then returns the result to the device 105.

Processing the results in determining a value representative of the belt tension along with a confidence coefficient. This value together with the confidence coefficient can then be reported to the user, whereby a report will only be made when the confidence coefficient is larger than a predefined value. This latter value may, in turn, depend on the type of machine, the device 104 itself, or even the age of the belt 101.

The assessment of whether the measured belt tension is in a correct range, can be done by the user himself by comparing the measured belt tension with reference values, as specified by a manufacturer for the machine in question. On the other hand, this assessment can also be done automatically by logics built into the device 101, wherein information from the machine into which the belt is built, is compared to the measured belt tension.

Hereafter, it will be described how the sound recording 204 is processed to arrive at the measured belt tension.

Figure 4:
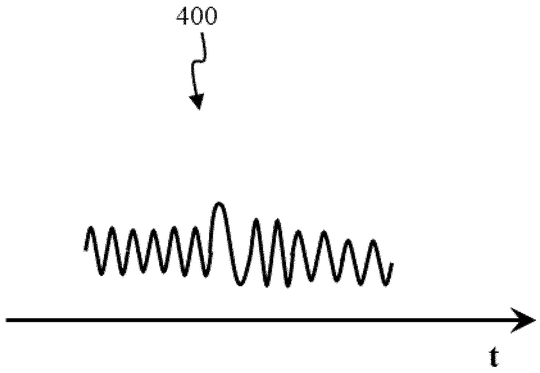
FIG. 4 illustrates a filtered data set in which a belt is not excited by filtering the data set based on a band pass filter.

After splitting up the audio recording 204 into parts 200 and 201, part 200 is processed through a bandpass filter with boundaries f1 and f2 to remove non-relevant areas. The filtered part 200 can then be further represented as a filtered data set 400, as illustrated in FIG. 4. From the filtered data set 400, a trigger threshold value is then calculated, which is a standard deviation, optionally multiplied by a predefined constant with a value between one and ten, of the values in the data set 400. Alternatively, an average, an effective value, or other value indicative of the distribution of the values in 400 may also be calculated.

Figure 3:
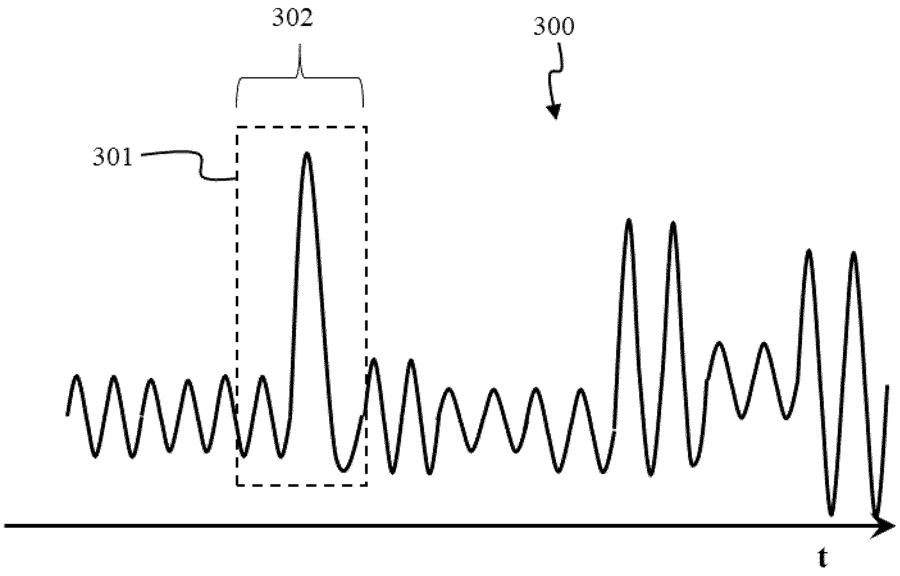
FIG. 3 illustrates a filtered data set in which a belt is excited by filtering the data set based on a band pass filter.

Part 201 is processed by the same bandpass filter as part 200 and is shown as the filtered data set 300 in FIG. 3.

Figure 5:
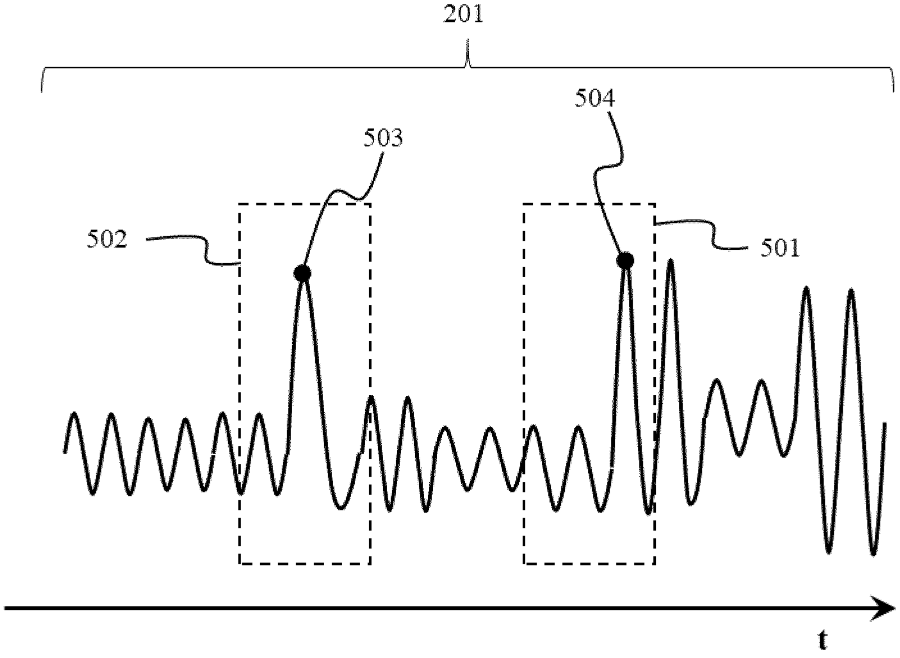
FIG. 5 illustrates a time period during which the belt is excited and over which second time windows are overlayed.

Next, a secondary time interval 302 is defined which is equal to or smaller than the time interval 201. A window 301 is overlayed over this and a maximum value occurring in the window is determined. This is further illustrated in FIG. 5, wherein in two windows 501 and 502, the maximum values 503 and 504 are determined. If a maximum value is larger than a predefined value, it is considered a trigger. If the maximum value is smaller than the predefined value, the window is advanced further, unless it exceeds the length of part 201.

In the event of a trigger, the window 502 is positioned at the time interval 302 around this maximum value 503. Furthermore, the distance from the first value in the window 502 to the maximum value 503 can be selected as a further operating parameter. The window is then positioned past the maximum value 503 using these operating parameters and again a maximum value that exceeds the predefined value is searched for. Thus, multiple sets can be identified, such as sets 502 and 501.

Alternatively, it can also be chosen to have window 301 not overlay part 300, but directly overlay part 201 and then apply the bandpass filter to the data in the window to thus obtain part 300.

Figure 6:
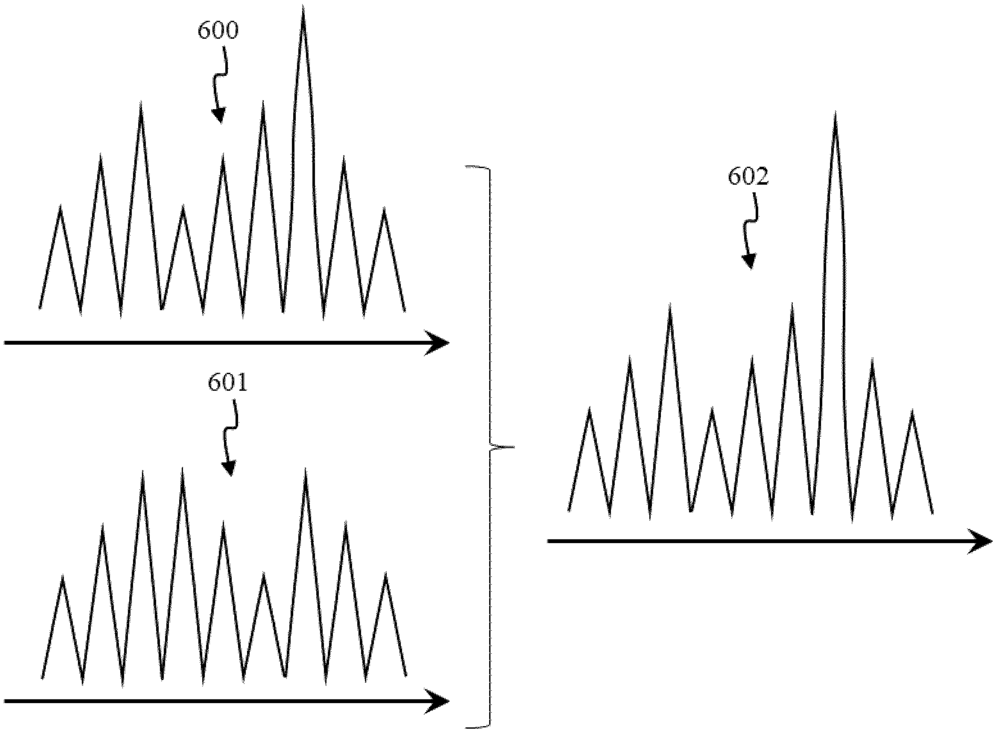
FIG. 6 illustrates processing of results to determine the belt tension.

Furthermore, an effective value of the values in the windows 502 and 501 is calculated, hence in windows in which a maximum value is identified that exceeds the predefined value. If this respective effective value is smaller than a predetermined value, the values in the corresponding window are no longer processed. If the respective effective value is equal to or larger than this predetermined value, the results will continue to be processed. This further processing is illustrated in FIG. 6.

The values that are further processed, are transformed to the frequency domain, for example by a Fast-Fourier algorithm. For example, for the windows 501 and 502, these become values 600 and 601 respectively. These data 600, 601 in the frequency domain are then combined into mean values 602 in the frequency domain, wherein in this spectrum 602 a value is associated with different frequencies.

Next, in the spectrum 602, the two frequencies with largest and second largest amplitude are identified by a search algorithm. The frequency with the highest amplitude is further referred to as Fm1, the one with the second highest as Fm2, with amplitudes Am1 and Am2 respectively. Next, a confidence coefficient is calculated by calculating the ratio of Am1 over Am2.

The calculated confidence coefficient is compared with a predefined threshold value. This threshold value can be defined on the basis of reference measurements that depend on the type of machine, type of environment, as well as on the certainty that a measurement must be correct. A low threshold value yields more results, but is potentially incorrect, a high threshold value decreases the chance of an incorrect measurement, but results in more rejected results. For this purpose, a list of different threshold values can be used from which the most suitable can be set.

When the confidence coefficient exceeds this predefined value, the belt tension is then determined based on Fm1.

If a lot of background noise is present that is stable and includes tonal components, this background noise can make it difficult to identify the belt tension. The determined frequency may then be a frequency that was present in the background and therefore does not correspond to the belt tension. Therefore, optionally an additional correction can be made after determining the spectrum 602. To perform the correction, the data in 400 is also transformed to the frequency domain.

When the difference between the values of 400 in the frequency domain and the values in 602 is larger than a certain value, no compensation is performed. For frequencies wherein the difference is less than a certain value, these peaks are compensated. This reduces tonal components present in the background, but does not alter those only originating from the belt. In this way, the chance is larger that Fm1 is indeed representative for the vibration frequency of the belt, and hence the belt tension.

The optional compensating step is to avoid any detection of a second harmonic order of the belt vibration frequency. When the belt vibrates with a certain frequency, multiples, hence harmonics, may also occur. These harmonics can therefore be present in the sound and thus in the measured spectrum. In certain cases, the second harmonic can have an even higher amplitude than the fundamental frequency of the vibration of the belt. As a result, a wrong belt tension will therefore be determined. To avoid this, it is checked whether a peak at frequency Fm1/2 is also present when Fm1 is detected, and this with a certain predetermined minimum ratio. If this is the case, the determined frequency Fm1 is considered as an harmonic and is not taken into account. The belt tension will then correspond to Fm1/2 instead of Fm1.

Finally, the obtained results can be reported. However, if the confidence coefficient is less than the predetermined threshold value, the user is notified that the measurement was unsuccessful. Based on this, the user can then be urged to perform a new measurement.

The invention claimed is:

1. A computer-implemented method for determining a belt tension of a drive belt of a machine, based on a sound recording, wherein the drive belt is suitable for transmitting a mechanical torque, the method comprising the steps of:
- initiating a recording of sound in proximity of the drive belt;
- recording the sound during a primary time interval comprising:
  - a part t_b during which the drive belt is not excited;
  - a part t_a during which the drive belt is excited one or more times;
- discretising the sound of the primary time interval into time samples according to a predefined sampling frequency, thereby obtaining a data set;
- filtering the data set based on a bandpass filter, thereby obtaining a filtered data set;
- determining within part t_b of the filtered dataset:
  - a trigger threshold value indicative of a distribution of values within the part t_b of the filtered dataset;
  - a reference spectrum;
- determining an average excitation spectrum of excitation spectra of one or more secondary time intervals within part t_a of the filtered data set, a secondary time interval comprising:
  - a value which exceeds the trigger threshold value and a root mean square of the values which exceeds a predefined factor;

compensating the average excitation spectrum with the reference spectrum, thereby obtaining a compensated excitation spectrum;

determining a confidence coefficient based on a highest and second highest extremum within the compensated excitation spectrum; and when the confidence coefficient exceeds a predefined value:

determining the belt tension based on a frequency of the highest extremum.

2. The computer-implemented method of claim 1, further comprising the steps of:

retrieving one or more characteristics of the drive belt;

expressing the belt tension based on one or more of the one or more characteristics.

3. The computer-implemented method according to claim 1, further comprising the steps of:

retrieving one or more expected characteristics of the machine;

comparing the belt tension with the one or more expected characteristics;

reporting a status of the drive belt based on the comparison.

4. The computer-implemented method according to claim 1, wherein compensating with the reference spectrum comprises:

determining a difference between the reference spectrum and the excitation spectrum, thereby obtaining a difference spectrum;

excluding compensating values which exceed a predefined threshold within the difference spectrum.

5. The computer-implemented method according to claim 1, further comprising the step of:

determining a first amplitude of the sound at the frequency of the highest extremum and a second amplitude at the half-frequency thereof; and when the ratio between the second and the first amplitude exceeds a predefined value:

correcting the data set by eliminating the values associated with the frequency of the highest extremum.

6. The computer-implemented method according to claim 3, further comprising the step of:

supplying appropriate machine operating parameters based on the characteristics and the belt tension.

7. The computer-implemented method according to claim 6, further comprising the step of:

setting the appropriate operating parameters.

8. A non-volatile computer-readable storage medium containing a computer program product containing computer-executable instructions to perform the computer-implemented method according to claim 1 when this program is executed on a computer.

9. A user device configured to determine a belt tension of a machine according to the computer-implemented method according to claim 1.

10. A machine comprising the user device according to claim 9.

* * * * *